United States Patent [19]

Davis et al.

[11] 4,161,468

[45] Jul. 17, 1979

[54] PROCESS FOR THE PREPARATION OF GRAFT POLYMER DISPERSIONS EMPLOYING LIQUID FREE RADICAL CATALYSTS

[75] Inventors: John E. Davis, Woodhaven; Pauls Davis, Gibraltar, both of Mich.

[73] Assignee: BASF Wyandotte Corporation, Wyandotte, Mich.

[21] Appl. No.: 913,911

[22] Filed: Jun. 7, 1978

Related U.S. Application Data

[63] Continuation-in-part of Ser. No. 846,034, Oct. 27, 1977, abandoned.

[51] Int. Cl.$^2$ .............................. C08F 2/06; C08F 4/04; C08F 20/44; C08L 67/06
[52] U.S. Cl. .................... 260/30.4 R; 260/30.6 R; 260/30.8 R; 260/31.2 XA; 260/31.4 R; 260/33.2 R; 260/33.4 R; 260/34.2; 526/78; 526/88; 526/204; 526/211; 526/218; 526/219; 525/404; 525/412; 526/273; 525/529

[58] Field of Search ............... 260/30.4 R, 30.8 R, 260/33.2 R, 33.4 R, 34.2, 30.6 R, 31.4 R, 31.2 XA; 526/204, 218, 219, 273, 342, 211

[56] References Cited

U.S. PATENT DOCUMENTS

| 3,652,639 | 3/1972 | Pizzini et al. ................. 260/859 R |
| 3,875,258 | 4/1975 | Patton et al. ................. 260/869 |
| 3,950,317 | 4/1976 | Patton et al. ................. 526/78 |
| 4,007,165 | 2/1977 | MacLeay et al. ............... 526/218 |

*Primary Examiner*—Herbert J. Lilling
*Attorney, Agent, or Firm*—Joseph D. Michaels; Robert E. Dunn; Bernhard R. Swick

[57] ABSTRACT

Graft polymer dispersions are prepared by the in situ polymerization in the presence of a free radical catalyst of an ethylenically unsaturated monomer or mixture of monomers in a liquid polyol employing as the free radical catalyst a liquid unsymmetrically-substituted azo compound having a melting point less than 30° C. and a ten hour half-life between 55° C. and 100° C. The dispersions are low viscous liquids which may be advantageously employed in the preparation of polyurethane foams.

7 Claims, No Drawings

PROCESS FOR THE PREPARATION OF GRAFT POLYMER DISPERSIONS EMPLOYING LIQUID FREE RADICAL CATALYSTS

CROSS REFERENCE TO RELATED U.S. PATENT APPLICATION

The subject application is a continuation-in-part of U.S. patent application Ser. No. 846,034, filed Oct. 27, 1977, and now abandoned.

BACKGROUND OF THE INVENTION

1. Field of the Invention

The present invention relates to stable graft polymer dispersions having low viscosity and containing less toxic by-products than found in commercially available graft polymer dispersions. More particularly, the invention relates to graft polymer dispersions prepared by the in situ polymerization of an ethylenically unsaturated monomer or mixture of monomers in a polyol in the presence of certain liquid free radical azo catalysts.

2. Prior Art

Graft polymer dispersions prepared by the in situ polymerization of an ethylenically unsaturated monomer or mixture of monomers in a polyol in the presence of a free radical catalyst and the use thereof in the preparation of polyurethanes are well known in the art as evidenced by U.S. Pat. Nos. 3,652,659; 3,875,258; 3,950,317, and U.S. Pat. Nos. Re. 28,715 and Re. 29,014. While these patents disclose various methods of preparing graft polymer dispersions, the most preferred method involves the simultaneous addition at a steady rate of a stream of monomer and a stream of catalyst dispersed in a portion of polyol to a reactor containing the remaining portion of the polyol. Numerous free radical catalysts are taught to be useful in the process described in the above patents with azobis(isobutyronitrile) generally described as the catalyst of preference. While azobis(isobutyronitrile) is a most suitable catalyst for the polymerization reaction, it is a solid at room temperature and only slightly soluble in the polyol and as a result thereof requires that it be continually stirred with the polyol so that it may be introduced into the reaction system in equally measured amounts. Moreover, when azobis(isobutyronitrile) decomposes during the reaction, one of its decomposition products, namely tetramethylsuccinonitrile, is an extremely toxic substance which is exceptionally difficult if not impossible to remove in toto from the graft polymer dispersion. The present invention relates to an improved process for the preparation of graft polymer dispersions comprising employing as the free radical catalyst certain liquid azo compounds.

SUMMARY OF THE INVENTION

The present invention relates to the preparation of graft polymer dispersions by the in situ polymerization in the presence of a free radical catalyst of an ethylenically unsaturated monomer or mixture of monomers in a liquid polyol employing as the free radical catalyst a liquid unsymmetrically-substituted azo compound having a ten hour half-life between 55° C. and 100° C. and represented by the formula:

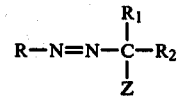

wherein
R is a lower alkyl of 1–6 carbon atoms and
$R_1$ is selected from alkyl of 1–20 carbon atoms, phenalkyl of 7–12 carbon atoms, cycloalkyl of 3–12 carbon atoms, a heterocyclo radical wherein the hetero atoms is O, S or N and together with $R_2$ can form an alkylene biradical of from 2 to 16 carbon atoms, and can be substituted by Z, $R_2$ is R, or phenyl and Z is H, CN, S—$R_2$ or O—$R_2$.

The resulting dispersions have viscosities generally equal to or better than those attained employing azobis(isobutyronitrile), are more easily prepared since the catalysts are liquid and do not contain toxic decomposition products.

DESCRIPTION OF THE PREFERRED EMBODIMENTS

In accordance with the process of the subject invention, an ethylenically unsaturated monomer or mixture of monomers is polymerized in a polyol in the presence of a liquid free radical catalyst having the formula:

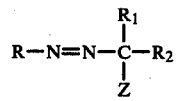

wherein
R is a lower alkyl of 1–6 carbon atoms and
$R_1$ is selected from alkyl of 1–20 carbon atoms, phenalkyl of 7–12 carbon atoms, cycloalkyl of 3–12 carbon atoms, a heterocyclo radical wherein the hetero atoms is O, S or N and together with $R_2$ can form an alkylene biradical of from 2 to 16 carbon atoms, and can be substituted by Z, $R_2$ is R, or phenyl and Z is H, CN, S—$R_2$ or O—$R_2$.

Representative catalysts used in the subject invention include
2-t-butylazo-2-cyano-4-methoxy-4-methylpentane
2-t-butylazo-2-cyano-4-methylpentane
2-t-amylazo-2-cyano-4-methylpentane
1-t-butylazo-1-cyanocyclohexane
2-t-butylazo-2-cyanobutane
1-t-amylazo-1-cyanocyclohexane
2-t-butylazoisobutyronitrile
1-t-butylazo-1-methoxycyclohexane
4-t-butylazo-2,4-dimethoxyoctane
1-t-butylazo-1-phenylcyclohexane
2-isopropylazo-2-cyanopropane
1-sec-butylazo-1-cyanocyclohexane The preparation of many of these catalysts is described in U.S. Pat. No. 4,007,165. In the process of the subject invention, there is generally employed from about 1% to 10% by weight of the catalyst based on the weight of the monomer(s).

The polyols which may be employed in the present invention are well known in the art. Both conventional polyols essentially free from ethylenic unsaturation such as those described in U.S. Pat. No. Re. 28,715 and unsaturated polyols such as those discribed in U.S. Pat. Nos. 3,652,659 and Re. 29,014 may be employed in the invention. Representative polyols essentially free from ethylenic unsaturation which may be employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557.

Representative polyols include polyhydroxyl-containing polyesters, polyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethyl-succinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propylene glycol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)-propane and blends thereof having equivalent weights of from 100 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,4-diaminotoluene; aliphatic amines such as methylamine, triisopropanolamine, ethylenediamine, 1,3-propylenediamine, 1,4-butylenediamine, and 1,3-butylenediamine.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed in the present invention may be prepared by the reaction of any conventional polyol such as those described above with an organic compound having both ethylenic unsaturation and a hydroxyl, carboxyl, anhydride, or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid and anhydride, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexane-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is then necessary to react the unsaturated polyol with an alkylene oxide preferably ethylene or propylene oxide, to replace the carboxyl groups with hydroxyl groups prior to employment in the present invention. The amount of alkylene oxide employed is such to reduce the acid number of the unsaturated polyol to about one or less.

To prepare the unsaturated polyols of use in the present invention, from about 0.05 mole to about 3.0 moles, preferably from 0.30 mole to 1.50 moles, of said organic compound per mole of polyol is employed. The preparation of the unsaturated polyols employed in the present invention follows conventional prior art procedures such as disclosed in U.S. Pat. No. 3,275,606 and U.S. Pat. No. 3,280,077. Generally, this requires a reaction at a temperature between 0° C. and 130° C. Both acidic catalysts, such as Lewis acid catalysts and basic catalysts such as alkali metal hydroxides, may be used. In addition, a noncatalyzed reaction may be used employing temperatures between 50° C. and 200° C.

As mentioned above, the graft copolymers of the invention are prepared by the in situ polymerization in the above-described polyols of an ethylenically unsaturated monomer or a mixture of ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis($\beta$-chloroethyl) vinylphosphonate, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

The amount of ethylenically unsaturated monomer employed in the polymerization reaction is generally from 1% to 40%, preferably from 15% to 30%, based on the weight of the graft polymer dispersion. The polymerization occurs at a temperature between about 80° C. and 170° C., preferably from 105° C. to 135° C.

In general the process of the subject invention is carried out by blending the catalysts and a portion of the polyol to form a homogeneous stream and simultaneously adding at a steady rate this stream along with a stream of an ethylenically unsaturated monomer or mixture of monomers to a reactor containing the remaining portion of polyol. In a preferred embodiment, the two streams are blended in a static mixture just prior to being added to the polyols in the reactor as described more thoroughly in U.S. Pat. No. 3,950,317. As a general rule, the catalyst-polyol stream is added to the reactor over a period slightly in excess of the monomer stream. This is to assure more complete polymerization of the monomer.

In the Examples that follow, the following polyols are employed:

Polyol A—a polyol having a hydroxyl number of 33 and an oxyethylene content of 15% by weight prepared by capping with ethylene oxide a propylene oxide/allylglycidyl ether heteric adduct of a mixture of glycerine and propylene glycol Polyol B—a polyol having a hydroxyl number of 50 and an oxyethylene content of 9% by weight prepared by capping with ethylene oxide a propylene oxide/allylglycidyl ether heteric adduct of glycerine Polyol C—a polyol having a hydroxyl number of 51 and an oxyethylene content of 9% by weight prepared by capping with ethylene oxide a propylene oxide adduct of glycerine Polyol D—a polyol having a hydroxyl number of 33 and an oxyethylene content of 15% by weight prepared by capping with ethylene oxide a propylene oxide adduct of a mixture of glycerine and propylene glycol In the following examples, all parts are by weight unless otherwise indicated.

EXAMPLE I

A reaction vessel equipped with a thermometer, stirrer, nitrogen source, inlet means and heat exchange means was charged with 1655 parts of Polyol A. Nitrogen was bubbled through the polyol for about one hour. With stirring and under a slight nitrogen flow, the charge was heated to 120° C. A stream of a mixture of 803.5 parts of acrylonitrile and 268 parts of styrene and a stream of 10.7 parts of 1-t-amylazo-1-cyanocyclohexane in 840 parts of Polyol A were fed into a KENICS static mixer and continuously added to the charge over a period of three hours at 120° C. Upon completion of the addition, the reaction mixture was maintained at 120° C. for thirty minutes. The reaction mixture was then stripped for one-half hour at 120° C. under less than five millimeters of mercury. The stripped reaction product was a liquid dispersion having a Brookfield viscosity at 25° C. of 3200 cps. and a hydroxyl number of 23.5.

EXAMPLE II

A reaction vessel equipped as described in Example I was charged with 163.5 parts of Polyol A. Nitrogen was bubbled through the polyol for about one hour. With stirring and under a slight nitrogen flow, the charge was heated to 120° C. A stream of a mixture of 80.35 parts of acrylonitrile and 26.8 parts of styrene and a stream of 1.07 parts of 1-t-butylazo-1-cyanocyclohexane in 84 parts of Polyol A were fed into a KENICS static mixer and continuously added to the charge over a period of ninety minutes at 120° C. Upon completion of the addition, the reaction mixture was maintained at 120° C. for twenty minutes. The reaction mixture was then stripped for one-half hour at 120° C. under less than five millimeters of mercury. The stripped reaction product was a liquid dispersion having a Brookfield viscosity at 25° C. of 3100 cps. and a hydroxyl number of 23.

The above example was duplicated with the exception that the catalyst employed was 2-t-butylazo-2-cyano-4-methoxy-4-methylpentane. Results substantially as indicated above are obtained.

EXAMPLES III–VIII

A series of graft polymer dispersions was prepared employing various polyols, ethylenically unsaturated monomers and amounts thereof. In each preparation, 1-t-amylazo-1-cyanocyclohexane was employed as the free-radical catalyst. Details of the preparations as well as physical characteristics of the resulting dispersions are presented as Table I below.

Table 1

| Example | Polyol, | Parts | Monomer, | Parts | Catalyst** Parts | Graft Polymer Dispersion OH # | Viscosity, cps. |
|---|---|---|---|---|---|---|---|
| III | B | 218 | ACN* | 70.35 | 0.938 | 35 | 2300 |
|  |  |  | STY* | 23.45 |  |  |  |
| IV | B | 218 | ACN | 51.1 | 1.87 | 35 | 2900 |
|  |  |  | STY | 37.4 |  |  |  |
| V | C | 875 | ACN | 282.4 | 3.77 | 35 | 3480 |
|  |  |  | STY | 94.1 |  |  |  |
| VI | D | 100 | ACN | 32.1 | 0.43 | 23 | 3450 |
|  |  |  | STY | 10.7 |  |  |  |
| VII | A | 260 | ACN | 26.0 | 1.14 | 26.0 | 2450 |
|  |  |  | STY | 39.0 |  |  |  |
| VIII | B | 255 | ACN | 32.0 | 1.50 | 46.0 | 1700 |
|  |  |  | STY | 32.0 |  |  |  |

*ACN - Acrylonitrile
*STY - Styrene
**1-t-amylazo-1-cyanocyclohexane

EXAMPLE IX

A series of graft polymer dispersions was prepared in the manner described in Example I. In each preparation 100 parts of Polyol B was employed along with 30 parts of a 3:1 weight mixture of acrylonitrile and styrene. The reactions were carried out in the presence of two parts of various catalysts. In each instance, viscous graft polymer dispersions were prepared.

The catalysts employed were as follows:
2-t-butylazo-2-cyano-4-methoxy-4-methylpentane
2-t-butylazo-2-cyano-4-methylpentane
2-t-butylazoisobutyronitrile and
2-t-butylazo-2-cyanobutane

EXAMPLE X

A reaction vessel equipped with a thermometer, stirrer, nitrogen source, inlet means and heat exchange means was charged with 65 parts of Polyol A. Nitrogen was bubbled through the polyol for about one hour. With stirring and under a slight nitrogen flow, the charge was heated to 120° C. A stream of 20 parts of butyl methacrylate and a stream of 2 parts of 1-t-amylazo-1-cyanocyclohexane in 35 parts of Polyol A were fed into a KENICS static mixer and continuously added to the charge over a period of three hours at 120° C. Upon completion of the addition, the reaction mixture was maintained at 120° C. for thirty minutes. The reaction mixture was then stripped for one-half hour at 120° C. under less than five millimeters of mercury. The stripped reaction product was a liquid dispersion having a Brookfield viscosity at 25° C. of 17,600 cps. and a hydroxyl number of 23.5.

EXAMPLE XI

A series of graft polymer dispersions was prepared in the manner described in Example I. In each preparation, 100 parts of Polyol B was employed along with 30 parts of a 3:1 weight mixture of acrylonitrile and styrene. The reactions were carried out in the presence of two parts of various catalysts. In each instance, the polymers coagulated. In certain instances, stripping loss indicated that a low order of monomer conversion was obtained. The catalysts which were not effective in this reaction system all had a ten hour half-life outside of the range of the subject invention. The catalysts employed were 2-t-butylazo-2-4-dimethoxy-4-methylpentane (half life of 122° C.)

2-t-butylazo-2-methoxy-4-methyl pentane (half life of 135° C.)

2-t-butylazo-2-hydroperoxy-4-methyl pentane (half life of 36° C.)

t-butylazoformamide (half-life of 105° C.)

The embodiments of the invention in which an exclusive property or privilege is claimed are defined as follows:

1. In a process for the preparation of graft polymer dispersions by the in situ polymerization in the presence of a free radical catalyst of an ethylenically unsaturated monomer or mixture of monomers in a liquid polyol, the improvement which comprises employing as the free radical catalyst an unsymmetrically-substituted azo compound having a melting point less than 30° C. and a ten hour half-life between 55° C. and 100° C. and represented by the following formula

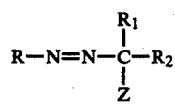

wherein

R is a lower alkyl of 1–6 carbon atoms and $R_1$ is selected from alkyl of 1–20 carbon atoms, phenalkyl of 7–12 carbon atoms, cycloalkyl of 3–12 carbon atoms, a heterocyclo radical wherein the hetero atoms is O, S or N and together with $R_2$ can form an alkylene biradical of from 2 to 16 carbon atoms, and can be substituted by Z, $R_2$ is R, or phenyl and Z is H, CN, S—$R_2$ or O—$R_2$.

2. The process of claim 1 wherein the monomer is a mixture of styrene and acrylonitrile.

3. The process of claim 1 wherein the liquid polyol has an equivalent weight of from 1000 to 3000 and is prepared by the use of an organic compound having both ethylenic unsaturation and a hydroxyl, carboxyl, anhydride, or epoxy group in the preparation of the polyol.

4. The process of claim 3 wherein the organic compound is allylglycidyl ether.

5. The process of claim 3 wherein the polyol is an ethylene oxide adduct of a propylene oxide/allylglycidyl ether heteric reaction product of a mixture of glycerine and propylene glycol.

6. The process of claim 1 wherein the catalyst is 1-t-amylazo-1-cyanocyclohexane.

7. The process of claim 1 wherein the catalyst is 1-t-butylazo-1-cyanocyclohexane.